Jan. 1, 1924.
E. A. SMITH
ELEVATOR
Filed Oct. 11, 1921

INVENTOR
Edward A. Smith,
BY
Philip S. McJean.
ATTORNEY

Patented Jan. 1, 1924.

1,479,518

UNITED STATES PATENT OFFICE.

EDWARD A. SMITH, OF WEST ENGLEWOOD, NEW JERSEY.

ELEVATOR.

Application filed October 11, 1921. Serial No. 507,002.

*To all whom it may concern:*

Be it known that I, EDWARD A. SMITH, a citizen of the United States, and a resident of West Englewood, Bergen County, and State of New Jersey, have invented certain new and useful Improvements in Elevators, of which the following is a specification.

My present invention relates particularly to elevators of the electric traction type.

A special object of the invention is to apply the driving effort of the motor so as to utilize the power to the fullest possible extent.

Other objects are to protect the driving gearing and to arrange the parts as compactly as possible.

The foregoing and other objects are attained in the structure disclosed in the accompanying drawings which are illustrative of one of the commercial forms the invention may take.

Figure 1 in the drawings referred to is a plan and sectional view of the machine as taken on substantially the plane of line 1—1 of Figure 2.

Figure 1:
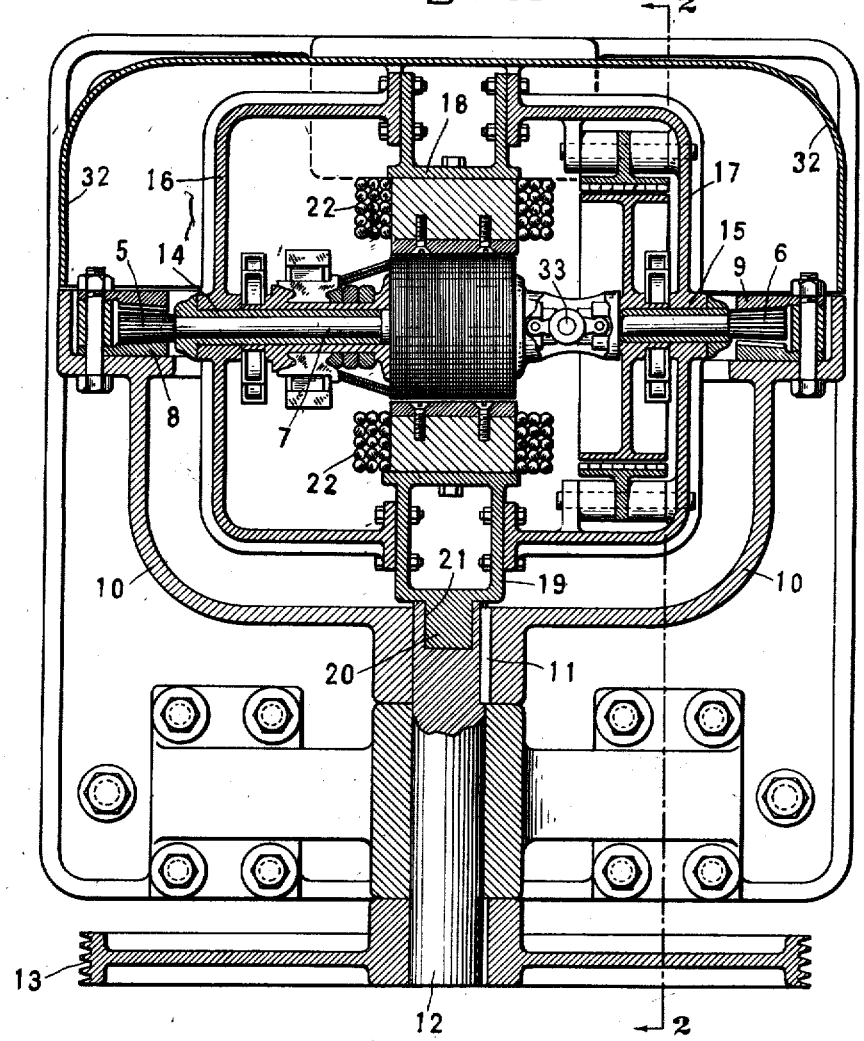
Figure 2:
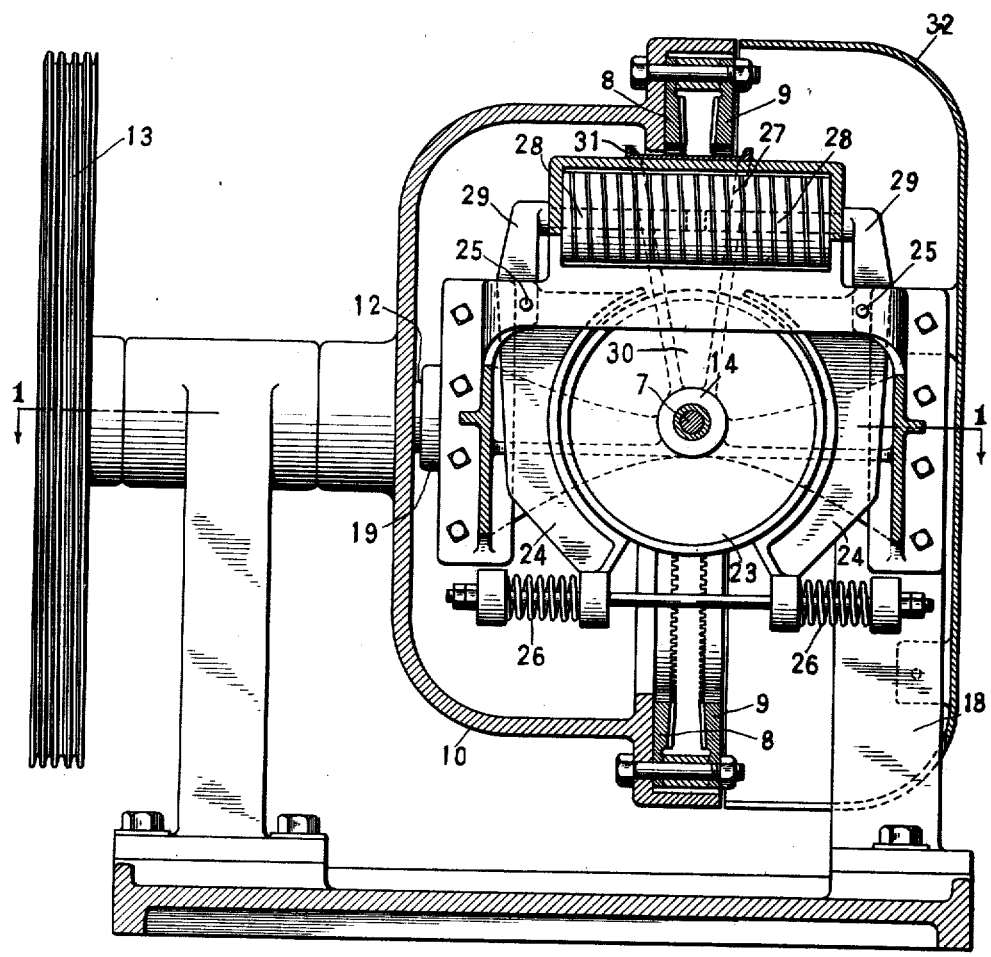
Figure 2 is a vertical sectional view as taken on substantially the plane of line 2—2 of Figure 1.
Figure 3:
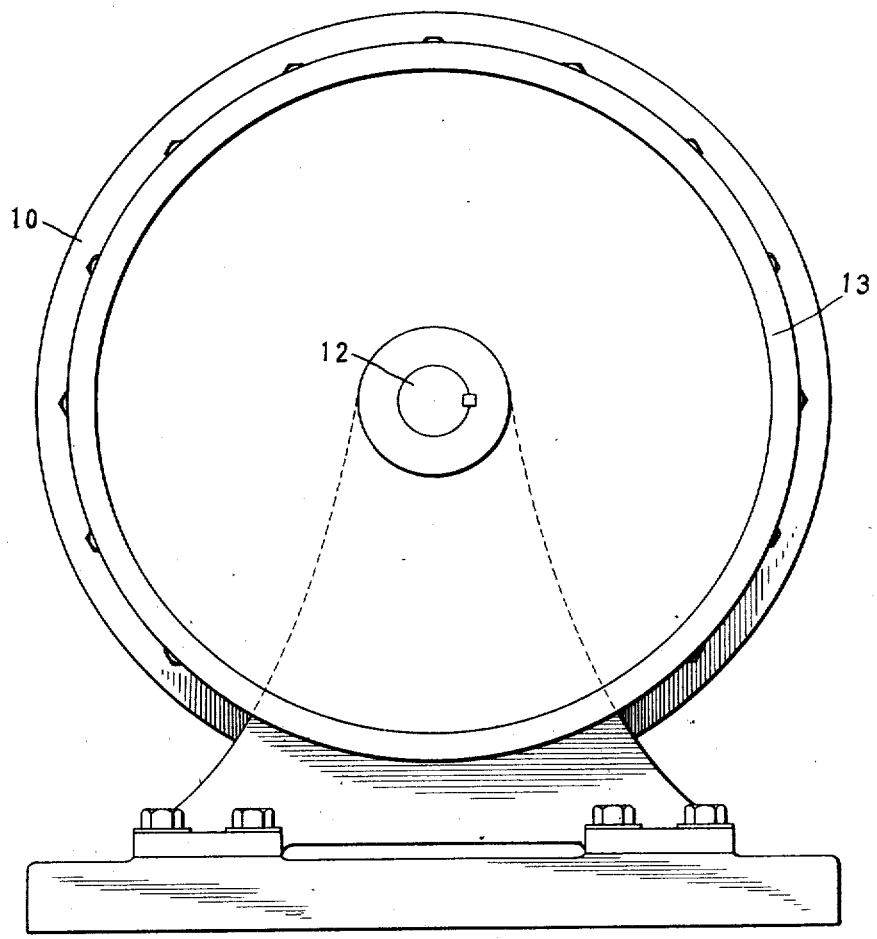
Figure 3 is an end view of the machine, looking at the sheave end of the apparatus.

One particular feature of the invention is that the drive is taken off from both ends of the armature shaft instead of from only one end as has been customary heretofore. As shown in Figure 1 this is accomplished by providing bevel pinions 5 and 6 on the opposite ends of the armature shaft 7 in mesh respectively with the bevel ring gears 8 and 9 fixed in opposed spaced relation to the bell shaped support or spider 10, which latter, as shown at 11, is keyed to the shaft 12 which carries the sheave 13.

The armature shaft is journaled near its opposite ends at 14, 15 in yoke shaped brackets 16, 17 which are fastened at their opposite ends to an upright supporting post 18 and a bracket 19 respectively, the latter having a stud 20 supported in a bearing socket 21 in the end of the sheave shaft and the whole constituting a rigid frame supporting the field structure 22 as well as the armature of the motor.

It will be apparent that upon rotation of the armature the driving force of the motor will be applied to the sheave shaft from both ends of the armature shaft. The ring gears through which the power is thus applied may be made as large as necessary so as to get the desired gear reduction and apply the leverage wanted on the sheave shaft. Usually these gears are of substantially the same diameter as the sheave, as illustrated, so that the power is applied approximately in line with the point of load.

In this manner the entire energy of the motor is applied directly and practically without any loss. Furthermore, the action is quiet and efficient in every way.

The brake in the present embodiment of the invention is housed within the stationary motor frame and is shown in the form of a brake drum 23 fast on the armature shaft and engaged by brake shoes 24 pivoted on the supporting frame at 25. These brake shoes are normally drawn together and into holding engagement with the brake pulley by springs 26 and are released by the magnet coil 27 which is constructed as a solenoid having cores 28 attached to the brake shoe levers 29.

To prevent oil and grease from the surrounding gears dropping down onto the motor, I may provide a shield such as I have indicated at 30 in the nature of a trough extending over the top of the motor and having upturned edges 31 converging downwardly at each side of the motor so as to direct the collected grease back to the pinions 5, 6.

The open side of the motor gearing may be closed by a bell shaped cover such as I have indicated at 32 which will keep out dust and other foreign matter.

To equalize the load and the wear on the gearing at the opposite ends of the motor shaft, I may provide an equalizer in the armature shaft such as indicated at 33. Also if it is found desirable to brace the outer end of the sheave shaft, I may provide a suitable outboard bearing for the same which can be carried by the base of the machine.

The mechanical efficiency of my improved form of elevator drive is considerably higher than the constructions heretofore employed, due to a large extent to the double driving connection from the armature shaft and the elimination of end thrust by balancing the drive pinions one against the other. By applying the force of the motor at opposite points in this way, a balanced division of the work is obtained and the gear pressure is reduced by reason of the fact that each pinion is only called upon to carry one half the load that would otherwise be required of it. It will be noted also that the gearing is reversible so that under certain conditions, the load might drive the motor as a generator and return current to the line, which, of course, is impossible with the worm drive gearing usually employed with electric elevators. Attention is also called to the fact that this invention is adapted to be used either as a "single wrap" traction machine, a "double wrap" or as a "drum machine."

What I claim is:

1. In an electric elevator, a stationary post, an electric motor having its frame fixed to said post and thereby held stationary, said motor having drive pinions at the opposite ends of its armature shaft, ring gears spaced in opposed relation and engaged respectively by the pinions on the opposite ends of the motor shaft and an elevator sheave directly connected with and operated by said ring gears.

2. A combination as in claim 1 with a support for the motor frame opposite said post and concentric to the ring gears.

3. In an electric elevator, an electric motor having an armature shaft with drive pinions at opposite ends of the same, a stationary support for the motor frame disposed at one side thereof, an elevator sheave journaled at the opposite side of the motor frame and gears directly connected with said sheave and spaced to be engaged respectively by the pinions on the opposite ends of the motor shaft.

4. In an elevator, the combination of an electric motor having drive pinions on the opposite ends of its armature shaft, ring gears spaced in opposed relation and engaged respectively with the pinions on the opposite ends of the motor shaft and driving connections from said ring gears to the elevator mechanism, including a shaft on which said ring gears are fixed and a sheave for the elevator cables fixed on said shaft, the motor being rigidly supported at one end and at its opposite end having a bearing in the end of said shaft.

5. A combination as in claim 3 with the gears and the sheave of substantially the same diameter, whereby the power is applied in effect at the rim of the sheave.

6. A combination as in claim 3 with a brake for the motor shaft positioned between the bearings of said shaft.

7. In an elevator, the combination of a motor having a drive shaft and pinions on the opposite ends of the same, a driven shaft, gears carried by said driven shaft, one engaged by the pinion on one end of the motor shaft and the other engaged by the pinion on the opposite end of the motor shaft and a trough extending over the top of the motor and arranged to deliver grease from the gears to the pinions on the opposite ends of the motor shaft.

8. In an elevator, the combination of an electric motor having drive gears on the opposite ends of its armature shaft, gears spaced in opposed relation and engaged respectively by the drive gears on the opposite ends of the motor shaft, an elevator drive shaft carrying said spaced driven gears, said shaft having a bearing for one end of the motor frame in the end thereof and a support for the opposite end of the motor frame.

9. In an elevator, a bearing, an elevator drive shaft journaled in said bearing and having a bearing at the end thereof, gears carried by said shaft in spaced opposed relation, a motor having its frame supported at one end and provided at its opposite end with a bearing element engaged with the bearing on the end of the elevator drive shaft, said motor having a drive shaft journaled in the frame and provided with drive pinions at its opposite ends engaged respectively with the spaced gears of the elevator drive shaft.

In witness whereof, I have hereunto set my hand this 21st day of September, 1921.

EDWARD A. SMITH.